United States Patent [19]

Black

[11] 4,433,490

[45] Feb. 28, 1984

[54] FLEXIBLE SURVEYOR'S MARKER

[76] Inventor: Charles E. Black, P.O. Box 791, Richmond, Ky. 40475

[21] Appl. No.: 371,432

[22] Filed: Apr. 23, 1982

[51] Int. Cl.³ .................. G01C 15/02; G01C 15/06
[52] U.S. Cl. ........................................ 33/293; 52/103; 116/209
[58] Field of Search ............... 33/293; 116/209, 208; 52/103

[56] References Cited

U.S. PATENT DOCUMENTS

| | | | |
|---|---|---|---|
| 2,798,317 | 7/1957 | Hargus | 33/293 |
| 3,279,133 | 10/1966 | Korte | 52/103 |
| 3,516,171 | 6/1970 | Martin | 33/293 |
| 3,600,812 | 8/1971 | Chromoga | 33/293 |
| 3,899,856 | 8/1975 | Johnson | 52/103 |
| 3,973,327 | 8/1976 | Cardinale | 33/293 |
| 4,050,404 | 9/1977 | McMackin | 52/103 |

Primary Examiner—Willis Little
Attorney, Agent, or Firm—Maurice L. Miller, Jr.

[57] ABSTRACT

A flexible surveyor's marker constructed of an elongated strip of stiff, yet flexible, foldable material such as Mylar plastic including an elongated body portion creased along a longitudinal centerline thereof and a pair of tabs connected to a transverse fold line along one end of the body portion and containing a nail hole in each tab is disclosed. The tabs are slidable one across and over the other to a position wherein the nail holes register with one another. The body portion is tiltable out of a plane containing the tabs toward a direction perpendicular to the plane containing the tabs as the tabs are slid one across and over the other toward registry of the nail holes.

12 Claims, 3 Drawing Figures

FLEXIBLE SURVEYOR'S MARKER

BACKGROUND OF THE INVENTION

This invention generally relates to flexible surveyor stakes which may be used in place of the usual rigid surveyor stakes for establishing precise lines, curves, grades, offsets, cuts and fills.

The usual rigid surveyor stakes which are typically constructed of wood, plastic and metal have long been in use in the prior art. Such stakes used on construction sites are susceptible to being dislodged from the ground, broken, bent and moved in such a way as to destroy the lines, curves, grades, offsets, cuts and fills that they represent. The dislodging and destruction of such stakes from their established positions often become a major problem when heavy construction vehicles are in operation in and around the vicinity in which such stakes are in use. Moreover, such prior art stakes are often bulky and heavy, making it difficult for surveying teams to handle and transport the same about a surveying site. This latter problem is intensified where such stakes are used on difficult terrain wherein the stakes must be carried to the surveying site on foot. Also, aligning and driving such prior art stakes is a tedious and slow process, relatively speaking.

By means of my invention, these and other difficulties known in the prior art are substantially overcome.

SUMMARY OF THE INVENTION

It is an object of my invention to provide a novel flexible surveyor's marker for use in place of conventional rigid surveyor stakes.

It is another object of my invention to provide a flexible surveyor's marker which often survives being struck by the wheels or treads of a vehicle in a manner which would usually dislodge or destroy conventional rigid surveyor stakes.

It is a further object of my invention to provide a flexible surveyor's marker which is lightweight and which can be stacked with other such markers to form a compact, lightweight and easily handled batch of said markers.

It is also an object of my invention to provide a flexible surveyor's marker which is relatively easily and quickly set in place and aligned with the aid of the usual surveyor's transit or level.

Briefly, in accordance with my invention, I provide a surveyor's marker comprising an elongated strip of relatively stiff, flexible, foldable material. The strip includes a body portion containing a crease which extends the length thereof along a longitudinal centerline. Also included is a pair of tabs attached to one end of the body portion along a transverse fold line, the tabs defining nail holes through the center thereof and being slidable one across the other to a position wherein the nail holes register with one another. The body portion is tiltable out of a plane containing the tabs toward a direction which is prependicular to the tabs as the tabs are slid across one another to a position wherein the holes are registered with one another.

These and other objects, features and advantages of the present invention will become apparent to those skilled in the art from the following detailed description and attached drawings upon which, by way of example, only a single preferred embodiment of my invention is presented.

DESCRIPTION OF THE PREFERRED EMBODIMENT

Figure 1:
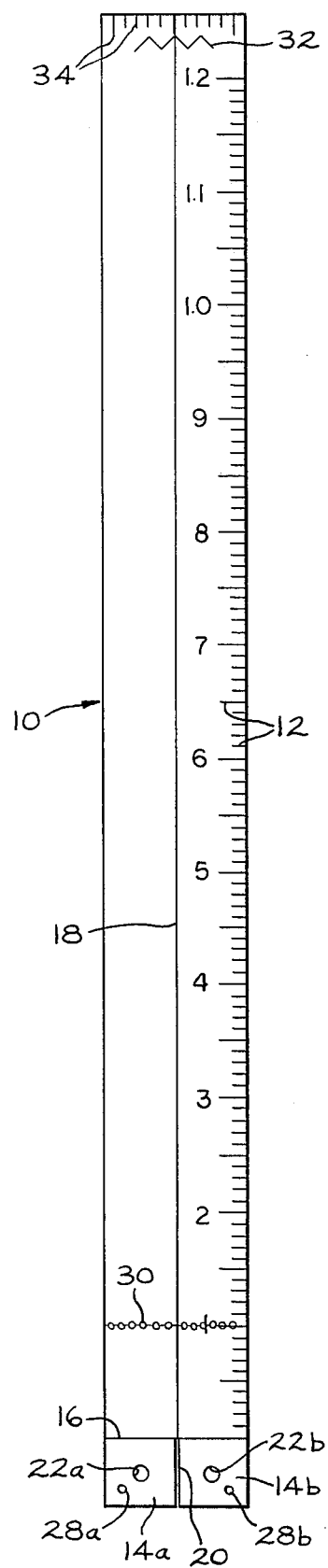
FIG. 1 shows a plan view of a flexible surveyor's marker as the same appears when in a stored position, thus illustrating one preferred embodiment of my invention.
Figure 2:
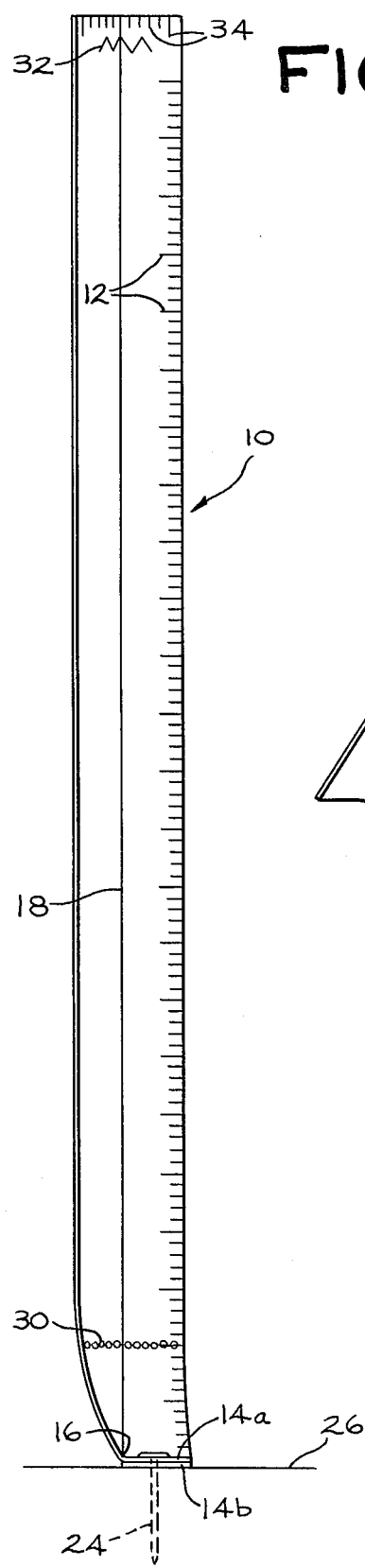
FIG. 2 shows a side elevation view of the marker of FIG. 1, with the marker being nailed to earth in a position of use.

Referring now to the drawing figures, there is shown in one preferred embodiment of my invention, a flexible surveyor's marker 10 characterized by an elongated strip of relatively stiff, yet flexible and foldable material such as, for example, a suitable plastic such as Mylar. The marker 10 includes a body portion, preferably containing suitable graduations 12, and a pair of rectangularly shaped tabs or legs 14a, b attached to one end of the body portion along a transverse fold line 16. The tabs 14a, b are formed on the lower end of the strip by cutting the lower end portion thereof along a longitudinally extending centerline 18 to form a slit 20 extending from the lower end of the strip to the fold line 16. The slit 20 below the fold line 16 should be precisely in line with the centerline 18 on the body portion of the marker 10. A pair of holes 22a, b are formed through the center of the tabs 14a, b, respectively.

Figure 3:
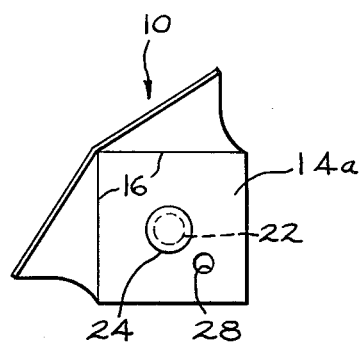
FIG. 3 shows a top plan view of the marker of FIG. 1 when in a position of use as shown in FIG. 2.

A crease is formed along the centerline 18 which extends the entire length of the body portion which allows the body portion to tilt out of the plane of the tabs 14a, b to a right angle with respect to the latter, as the tabs 14a, b are slid inwardly toward and across one another to the point where the tabs 14a, b and holes 22a,b lie in registry with one another (See the hole 22 in FIG. 3). The foregoing operation is readily accomplished by hand. A suitable nail 24 may thereafter be inserted through the registered holes 22a,b, and into a desired point in the ground 26, whereby the flexible marker 10 will stand erect to thus mark the point. In addition to the nail holes 22a,b, a pair of smaller tack holes 28a,b may be formed through the tabs 14a,b which are diagonally spaced from the holes 28a,b so as to likewise register with one another when the nail holes 22a,b lie in registry (See 28 in FIG. 3). The small tack holes 28a,b permit a surveyor to affix the marker 10 to objects such as trees, logs and conventional wooden stakes using conventional surveyor's tacks. Moreover, the provision of tack holes of relatively small diameter for use with small diameter tacks, permits the use of relatively larger diameter holes 22a,b sufficient for containing large diameter nails, spikes or the like.

A suitable transverse tear line 30 may be formed across a lower end portion of the graduated body of the marker 10 to permit the remaining upper portion of the graduated body to be torn away, as when the marker 10 is struck by the treads or wheels of a vehicle, so that the lower portion, including the tabs 14a,b and the nail 24 will not be dislodged from the ground 26 to cause a loss of the desired point as marked. The tear line 30 may be formed in any suitable and well known manner such as by means of a series of aligned perforations as shown, or a weakened line. The graduations 12 shown on the marker 10 of the present example are calibrated in tenths and hundredths of a foot as is usually preferred by engineers and surveyors in this country at the present time. Clearly, the particular calibrations of the graduations 12 are a matter of choice depending in part upon the use and purpose to which the marker 10 is to be applied. A suitable slit 32 may be formed in an upper end portion of the strip through which a piece of cloth or plastic ribbon may be extended to form a flag, not shown, to make the marker 10 more highly visible at a great distance. I prefer to make the slit 32 jagged or sawtoothed as shown so as to securely grip a cloth flag or plastic ribbon therein. Because the teeth of the slit 32 grip such a flag or ribbon more firmly when the flag or ribbon is pulled, I find it less likely that the same will be dislodged from the sawtooth slit 32 by wind and weather than where the slit 32 is a simple, straight, transverse slit.

In typical use, I have found that a survey line can be precisely located by the marker 10 of the present example. Ordinarily, this may be accomplished using only a single alignment and distance measurement. Moreover, because of its flexibility, I find that the marker 10 is rarely destroyed when run over by the wheels or treads of vehicles and heavy machinery. Only occasionally have I found that the upper portion of the marker 10 will be torn away along the tear line 30 when struck by a vehicle and, even in such cases, I find that the lower body portion and tabs 14a,b below the tear line 30 remain relatively intact with the nail 24 remaining in place to thus continue to mark the desired point where the marker 10 has been placed. Occasionally a lawn mower blade may strike the upper body portion of the marker 10 above the level of the tear line 30. In such cases, the blade will usually cause the upper portion of the marker 10 to be torn away along the tear line 30 before the nail 24 is dislodged from the ground thus avoiding loss of the marked position.

Where the marker 10 is used with a surveyor instrument for backsighting or for turning and ascertaining angles, I recommend that the centerline 18 be marked in a suitable dark ink. I also recommend, when the marker 10 is constructed of Mylar or other suitable plastic, that its surface be roughtextured rather than smooth to facilitate making marks thereon with ink, pencil or other types of marking material. Thus, the user may mark desired grade levels on the graduated scale 12 to indicate an amount of land fill or cut to be made at the point indicated by the marker 10.

Using the marker 10 of the present example, a surveyor may readily simplify the calculation of cut or fill to be made by a contractor at or near the point marked by indicating with a suitable marking pen the precise level on the scale 12 from which a vertical cut or fill is to be made. By selecting the precise and appropriate level on the scale 12, the surveyor can indicate to the contractor cuts or fills at each point marked in terms of whole numbers of feet rather than feet and fractional parts thereof. For example, suppose the marker 10 is attached by a tack to a wood grade hub stake at a point a precise selected horizontal distance from where a cut is to be made in the earth. Suppose further that the precise vertical cut to be made between the top of the hub stake to the planned finished grade is 3.30 feet. The surveyor could mark the scale 12 at 0.7 feet above the top of the hub, draw an arrow to the mark and indicate behind the arrow "Cut-4.00'". At the same time, the surveyor can mark the top of the marker 10 to indicate the precise horizontal offset distance between the hub and the line along which the desired cut is to be made.

A series of markers similar to the marker 10 can be hand-carried readily in the field by a surveyor team since the strips of plastic forming such markers are adapted to lie in flat, lightweight stacks when not in use.

The upper end of the body portion of the marker 10 contains a set of graduations 34 which are centered upon and extend outward on either side of the centerline 18. Among other purposes, the graduations 34 permit a survey instrument operator to find the centerline 18 when the latter is hidden from the instrument operator's view because of his line of vision with respect to the surface of the body portion of the marker 10. By knowing that there are five equally spaced graduations on either side of the centerline 18, he can measure the precise amount of angular turn of his instrument between successively spaced graduations and thus estimate with a high degree of precision the precise position of the hidden centerline 18. Another purpose of the graduations 32 is to enhance the ability of a surveyor to survey extremely precise straight lines over long distances such as is often required in highway survey work by the well known procedure of double centering. As is well known, the double centering procedure tends to reduce errors of alignment which always occur when extending a survey line from a back sight relative to a surveyor's instrument through a vertical arc to a forward sight position as the result of inherent inaccuracies or misalignment of the instrument itself. The graduations 34 extending laterally from the centerline 18 permit the instrument operator to more accurately split the difference in the instrument alignment observed to occur between successive back and forward sightings taken pursuant to the double centering procedure. By using a small hand drill, appropriate fasteners can be used to affix the marker of my invention to virtually any surface such as, for example, solid rock, concrete, coal and pavement in addition to being affixed to the earth, wood stakes, logs and the like as previously mentioned.

Although the subject invention has been shown and described with respect to specific details of a certain preferred embodiment thereof, it is not intended that such details limit the scope and coverage of this patent otherwise than as specifically set forth in the following claims.

I claim:

1. A surveyor's marker comprising an elongated strip of relatively stiff, flexible, foldable material which includes
    a body portion containing a crease which extends the length thereof along a longitudinal centerline, and
    a pair of tabs attached to one end of said body portion along a transverse fold line, said tabs defining nail holes through the center thereof and being slidable one across the other to a position wherein said nail holes register with one another, said body portion being tiltable out of a plane containing said tabs toward a direction perpendicular to said tabs as said tabs are slid across one another to a position wherein said nail holes are registered with one another.

2. The marker of claim 1 wherein said tabs are rectangularly shaped.

3. The marker of claim 1 wherein said tabs further define tack holes of lesser diameter than said nail holes being spaced from said nail holes such that said tack holes register with one another when said nail holes register with one another.

4. The marker of claim 1 wherein said material is plastic.

5. The marker of claim 1 further comprising a series of vertically extending graduated markings located on said body portion.

6. The marker of claim 1 further comprising a marked centerline extending longitudinally along said body portion.

7. The marker of claim 1 further comprising a transverse tear line formed on an end portion of said body portion nearest said fold line.

8. The marker of claim 1 further comprising a slit formed in an upper end portion of said body portion, said slit being adapted for holding a flag therein.

9. The marker of claim 4 wherein the surface of said material contains a rough finish to enable marking thereof with a marking means.

10. The marker of claim 6 further comprising a series of graduations extending laterally from either side of said centerline.

11. The marker of claim 8 wherein said slit is constructed in the form of a sawtooth.

12. The marker of claim 10 wherein said laterally extending graduations are located along an upper edge portion of said body portion.

* * * * *